US007343449B2

(12) United States Patent
Arai et al.

(10) Patent No.: US 7,343,449 B2
(45) Date of Patent: Mar. 11, 2008

(54) STORAGE SUBSYSTEM AND STORAGE SYSTEM

(75) Inventors: Koji Arai, Odawara (JP); Koji Nagata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 11/081,698

(22) Filed: Mar. 17, 2005

(65) Prior Publication Data

US 2005/0210210 A1    Sep. 22, 2005

(30) Foreign Application Priority Data

Mar. 22, 2004  (JP)  .............................. 2004-083120
Feb. 22, 2005  (JP)  .............................. 2005-045949

(51) Int. Cl.
*G06F 12/00*  (2006.01)

(52) U.S. Cl. ........................ 711/113; 711/114; 711/162

(58) Field of Classification Search ...................... None
See application file for complete search history.

(56) References Cited

U.S. PATENT DOCUMENTS

| 5,790,773 | A  | 8/1998  | Dekoning et al. |
| 5,835,953 | A  | 11/1998 | Ohran |
| 6,038,639 | A  | 3/2000  | O'Brien et al. |
| 6,253,295 | B1 | 6/2001  | Beal et al. |
| 6,434,681 | B1 | 8/2002  | Armangau |
| 6,484,186 | B1 | 11/2002 | Rungta |
| 6,643,671 | B2 | 11/2003 | Milillo et al. |
| 6,694,413 | B1 | 2/2004  | Mimatsu et al. |
| 6,748,504 | B2 | 6/2004  | Sawdon et al. |
| 6,771,843 | B1 | 8/2004  | Huber et al. |
| 6,981,114 | B1 * | 12/2005 | Wu et al. .................... 711/162 |
| 2003/0065901 | A1 | 4/2003  | Krishnamurthy |
| 2003/0101321 | A1 | 5/2003  | Ohran |
| 2003/0131193 | A1 | 7/2003  | Kodama et al. |
| 2003/0131278 | A1 | 7/2003  | Fujibayashi et al. |
| 2003/0221077 | A1 | 11/2003 | Ohno et al. |
| 2003/0229656 | A1 | 12/2003 | Hitz et al. |
| 2004/0107315 | A1 | 6/2004  | Watanabe et al. |
| 2004/0177226 | A1 | 9/2004  | Chen |

FOREIGN PATENT DOCUMENTS

EP    1424632    6/2004

* cited by examiner

*Primary Examiner*—Reginald Bragdon
*Assistant Examiner*—Shawn Gu
(74) *Attorney, Agent, or Firm*—Matingly, Stanger, Malur & Brundidge, P.C.

(57) ABSTRACT

The first storage subsystem, when new data is written in a first memory device beyond a certain timing, writes pre-updated data prior to update by said new data into a pre-updated data memory region and, in addition, updates snapshot management information that expresses a snapshot of a data group within the first memory device to information that expresses the snapshot at the certain timing and, at a later timing than the certain timing, judges, on the basis of the snapshot management information, in which of either the pre-updated data memory region or the first memory device the data constituting the data group at a certain timing exists, acquires data from the one in which the data exists and writes it into the second memory device of the second storage subsystem, and generates the certain timing repeatedly.

10 Claims, 6 Drawing Sheets

137 VOLUME MANAGEMENT TABLE

| VOL-ID | PASS INFORMATION | VOL TYPE | POOL VOL FLAG | PAIR INFORMATION (ex: PAIR PARTNER INFORMATION, PAIR STATE) |
|---|---|---|---|---|
| 1 | ... | PRIMARY VOL | 0 | .... |
| 2 | — | — | 1 | .... |
| 3 | — | — | 1 | .... |
| 4 | — | — | 1 | .... |
| ⋮ | ⋮ | ⋮ | ⋮ | .... |

| | ACTION | PRIMARY VOL | VIRTUAL VOL | SNAPSHOT MANAGEMENT INFORMATION | SECONDARY VOL | VIRTUAL VOL |
|---|---|---|---|---|---|---|
| TIME t0 | SPLITTING POINT OF PRIMARY VOL AND VIRTUAL VOL | IMAGE T0 [A] | IMAGE T0 (SIZE=0) | INFORMATION FOR RESTORING IMAGE T0 | — | — |
| TIME t1 | REMOTE COPY EXECUTION | IMAGE T1 [B] | IMAGE T0 [A] | INFORMATION FOR RESTORING IMAGE T0 | — | — |
| TIME t2 | REMOTE COPY COMPLETION | IMAGE T2 [B][C] | IMAGE T0 [A] | INFORMATION FOR RESTORING IMAGE T0 | IMAGE T0 [A] | — |
| TIME t3 | SPLITTING POINT OF PRIMARY VOL AND VIRTUAL VOL | IMAGE T3 [B][D] | IMAGE T3 (SIZE=0) | INFORMATION FOR RESTORING IMAGE T3 | IMAGE T0 [A] | — |
| TIME t4 | REMOTE COPY EXECUTION | IMAGE T4 [B][E] | IMAGE T3 [D] | INFORMATION FOR RESTORING IMAGE T3 | IMAGE T0 [A] | — |
| TIME t5 | REMOTE COPY COMPLETION | IMAGE T5 [F][E] | IMAGE T3 [B][D] | INFORMATION FOR RESTORING IMAGE T3 | IMAGE T3 [B][D] | IMAGE T3 [A] |
| TIME t6 | SPLITTING POINT OF PRIMARY VOL AND VIRTUAL VOL | IMAGE T6 [G][E] | IMAGE T6 (SIZE=0) | INFORMATION FOR RESTORING IMAGE T6 | IMAGE T3 [B][D] | IMAGE T3 [A] |
| ... | ... | ... | ... | ... | ... | ... |

STORAGE SUBSYSTEM AND STORAGE SYSTEM

CROSS-REFERENCE TO PRIOR APPLICATION

This application relates to and claims priority from Japanese Patent Application No. 2004-083120, filed on Mar. 22, 2004 and Japanese Patent Application No. 2005-45949, filed on Feb. 22, 2005 the entire disclosure of which are incorporated herein by reference.

BACKGROUND OF THE INVENTION

1. Field of the Invention

The present invention relates to a data storage control technique, and more specifically to a data copy technique.

2. Description of the Related Art

Storage systems that comprise a storage subsystem or a plurality of storage subsystems in which logical volumes can be loaded is known. Storage systems are used for, by way of example, the storage of multi-generation data in a plurality of storage subsystems whereby, should damage occur thereto, the restoration thereof can be implemented using the stored data (see, for example, Japanese Laid-Open Patent Application No. 2003-242011).

SUMMARY OF THE INVENTION

Incidentally, the plurality of storage subsystems referred to above includes a first and second communicably connected storage subsystems. A host device, which facilitates the transmission of write requests and write target data, is provided with connection to at least the first storage subsystem.

In this case the first storage subsystem, which comprises a cache memory, receives write requests and write target data from the host device, stores the received write target data in the cache memory and, in accordance with the received write requests, can write the write target data held in the cache memory in a first logical volume. Furthermore, the first storage subsystem can execute a processing known as remote copy. More specifically, by way of example, the first storage subsystem, by transferring the write target data stored in the cache memory to the second storage subsystem, can write the write target data into a second logical volume present in the second storage subsystem. Upon the processing of a write request from the host device the first storage subsystem can transmit a write completion notification to the host device at a prescribed timing.

Remote copy techniques include synchronous remote copy in which write completion notification is sent when write target data from the host device is written in not only the first logical volume but also the second logical volume, and non-synchronous remote copy in which the write completion notification is sent prior to the writing of the write target data, following which the write target data is written in the second logical volume.

In synchronous remote copy it is considered preferable for the time from the receipt of the write request to the sending of the write completion notification to be as far as possible shortened. However, unless the data processing capacity (by way of example, unless the CPU processing speed is high) of the first storage subsystem is high it is difficult for this time to be shortened.

Accordingly, the use of non-synchronous remote copy has been examined. In non-synchronous remote copy it considered preferable for the time from the sending of the write completion notification to the writing of the write target data in the second logical volume to be as far as possible shortened. However, to shorten this time the implementation of measures such as increasing the processing capacity of the first storage subsystem (by way of example, loading of a high-processing speed CPU in the first storage subsystem or increasing the number of loaded CPU) or increasing the speed of data transfer between the first storage subsystem and the second storage subsystem (by way of example, increasing the capacity of the communication line) are considered necessary.

In addition, in the examination of a method of non-synchronous remote copy in which data management is implemented prior to and following updating by the writing in a cache memory of, by way of example, updated data written in a first logical volume or pre-updated data written in a first logical volume, an increase in the data written in the cache memory has been found to occur to the extent that the data is updated. Although, in order to prevent this, a method for increasing the cache memory has been considered, this method is inherently more expensive. In addition, although a method in which either pre-updated data or updated data is written in a disk-type memory device comprising a first logical volume has been considered as a separate method thereto, by virtue of the fact that the writing of data in a disk-type memory device is slower than the writing of data in a cache memory, this is thought to be linked to a deterioration in the non-synchronous remote copy processing speed.

Accordingly, an object of the present invention is the provision of efficient non-synchronous remote copy.

Other objects of the invention will be clear from the description given below.

The storage subsystem based on a first aspect of the present invention is a first storage subsystem of a storage system comprising the first storage subsystem that comprises a first memory device and a second storage subsystem that comprises a second memory device. The first storage subsystem can be communicably connected to a host device for sending write target data and to the second storage subsystem. The first storage subsystem comprises means for writing write target data from the host device in the first memory device, a snapshot memory region for the memory of snapshot management information that expresses a snapshot of a data group within the first memory device, and a pre-updated data memory region for storing data that constitutes data prior to update by the write target data and is data that is written in the first memory device. The first storage subsystem comprises a pre-updated data write means, snapshot updating means, remote copy means, and timing generation means. The pre-updated data write means, beyond a certain timing and when write target data has been written in the first memory device, writes the pre-updated data in the pre-updated data memory region. The snapshot updating means, beyond the certain timing and when write target data has been written in the first memory device, updates the snapshot management information to information that expresses the snapshot at the certain timing. The remote copy means, at a later timing than the certain timing, judges on the basis of the snapshot management information updated at the later timing in which of either the pre-updated data memory region or the first memory device the data constituting the data group at the certain timing exists and, by acquiring and sending the data from the one in which the data exists to the second storage subsystem, constructs the data group at the certain timing in the second memory device. The timing generating means repeatedly generates the certain timing.

The memory device and memory region may be physical memory resources, or they may be logical memory resources provided on the physical memory resources. Examples of physical memory resources include a hard disk, magnetic disk, optical disk, magnetic tape and semiconductor memory. An example of a logical memory resource is a logical volume.

In one embodiment, the first storage subsystem can further comprise means for, when the certain timing has been generated again, deleting all pre-updated data stored in the pre-updated data memory region.

In one embodiment, the pre-updated data memory region is a third memory device that can be configured as a pair with the first memory device. The first storage subsystem can comprise local copy means for, in a case where the pair state of the first memory device and the third memory device in a first state, writing the write target data in not only the first memory device but also the third memory device. The timing generating means can repeatedly generate the certain timing by repeatedly making the pair state a second state.

In one embodiment the first storage subsystem can comprise a first type logical volume, provided in a physical memory device, for which no specific attributes are set, and a plurality of second type logical volumes, provided in a physical memory device, for which specific attributes are set. The first memory device and the second memory device can be formed to constitute the first type logical volume. The third memory device can be formed as a virtual logical volume configured from at least one abovementioned second type logical volume. The local copy means, by writing the write target data in a second type logical volume of the plurality of second type logical volumes that has free space, can write the write target data in the virtual logical volume.

In one embodiment, the first storage subsystem can comprise a cache memory for the temporary memory of the write target data exchanged between the host device and the first memory device. The pre-updated data memory region can be provided in the cache memory.

In one embodiment, the pre-updated data memory region may be provided in the first memory device (by way of example, hard disk). The first memory device referred to here may be a memory device in which the write target data from a host is written. It may also be a separate device thereto (by way of example, memory device in which no write target data from a host is written but in which control information for controlling the storage subsystem is written).

In one embodiment, the first storage subsystem may comprise a cache memory for the temporary memory of the write target data exchanged between the host device and the first memory device. All or part of the snapshot management information may be stored in at least one (by way of example, in both) of the cache memory and the first memory device. It should be noted that the "snapshot management information" referred to here forms snapshot management information 251 of a later-described embodiment. In this case, all or part of the snapshot management information 251 can be formed as at least one of a later-described finite difference bit map 202, address table 203 and snapshot management table 204. In addition, the first memory device referred to here may be a memory device in which write target data from a host is written, or a separate memory device thereto (by way of example, memory device in which no write target data from a host is written but in which control information for controlling the storage subsystem is written).

In one embodiment, the means can be actualized using hardware or write data from a host a computer program, or these in combination.

By way of example, the first storage subsystem can comprise a cache memory for the temporary memory of the write target data exchanged between a host device for sending write requests and write target data and the first logical volume, at least one computer, and a program memory region in which one or more computer programs are stored that, by being read by the at least one computer, actuate the at least one computer. The pre-updated data memory region can be provided on the cache memory. The at least one computer which read the one or more computer programs executes:

(1) the receiving of write requests and write target data from the host device;

(2) the writing of the received write target data in the first memory device in accordance with the received write requests;

(3) beyond the certain timing, in addition to the processing of the (2) every time the processing of (1) is implemented, the repetition of (4) to (7) below;

(4) the writing of the pre-updated data in the cache memory;

(5) the updating of the snapshot management information to information that expresses the snapshot at the certain timing in accordance with the updating of the first memory device by the writing of the write target data in the first memory device;

(6) at a later timing than the certain timing, the judging on the basis of the snapshot management information updated at the later timing in which of either the pre-updated data memory region or the first memory device the data constituting the data group at the certain timing exists and, by the acquisition and sending of the data from the one in which the data exists to the second storage subsystem, the construction of the data group at the certain timing in the second memory device; and (7) the generation of the certain timing.

Furthermore, when the certain timing occurs again, the at least one computer can delete all pre-updated data from the cache memory. The computer may constitute, by way of example, a processor such as a CPU, or it may constitute a circuit substrate in which a processor is loaded or a computer device (by way of example a personal computer, PDA (Personal Digital Assistant) or mobile telephone) comprising a plurality of hardware resources (by way of example, input devices such as CPU, memory, keys and output devices such as a display device).

In one embodiment, the timing generating means can regularly or irregularly execute the events for the generating of the certain timing.

A storage system based on a second aspect of the present invention comprises a first storage subsystem comprising a first memory device and a second storage subsystem comprising a second memory device.

The first storage subsystem can be communicably connected to a host device for sending write target data and the second storage subsystem. The first storage subsystem comprises means for writing write target data from the host device into the first memory device, a snapshot memory region for the memory of snapshot management information that expresses a snapshot of a data group within the first memory device, and a pre-updated data memory region for storing data that constitutes data prior to update by the write target data and constitutes data that has been written in the first memory device. The first storage subsystem comprises a pre-updated data write means, snapshot updating means, remote copy means, and timing generation means. The pre-updated data write means, beyond a certain timing when write target data is written in the first memory device, writes the pre-updated data in the pre-updated data memory region. The snapshot updating means, beyond the certain timing when the write target data is written in the first memory device, updates the snapshot management information to information that expresses the snapshot at the certain timing. The remote copy means, at a later timing than the certain timing, judges on the basis of the snapshot management information updated at the later timing in which of either the pre-updated data memory region or the first memory device the data constituting the data group at the certain timing exists and, acquires and sends the data from the one in which the data exists to the second storage subsystem. The timing generating means repeatedly generates the certain timing.

The second storage subsystem comprises means for, by the writing of data received from the first storage subsystem into the second memory device, the construction of the data group at the certain timing in the second memory device.

In one embodiment, the second storage subsystem comprises a separate snapshot memory region for the memory of separate snapshot management information that expresses a snapshot of a data group within the second memory device, a separate pre-updated memory region for the memory of separate pre-updated data that constitutes data prior to update by the data from abovementioned first storage subsystem constitutes data that has been written in the second memory device, pre-updated data write means for, when data from the first storage subsystem is written in the second memory device, writing the separate pre-updated data in the separate pre-updated memory region, and separate snapshot updating means for, when the data from the first storage subsystem is written in the second memory device, updating the snapshot management information.

A method based on the third aspect of the present invention is a storage control method implemented in a storage system that comprises a first storage subsystem comprising a first memory device and a second storage subsystem comprising a second memory device. The first storage subsystem can be communicably connected to a host device for sending write target data and the second storage subsystem. The first storage subsystem comprises a snapshot memory region for the memory of snapshot management information that expresses a snapshot of a data group within the first memory device, and pre-updated data memory region for storing data that constitutes data prior to update by the write target data and constitutes data that has been written in the first memory device. In this case, the storage control method comprises the steps of:

beyond a certain timing, writing write target data sent from the host device into the first memory device;

beyond the certain timing and when the write target data is written in the first memory device, writing the pre-updated data of the write target data in the pre-updated memory region;

beyond the certain timing and when the write target data is written in the first memory device, updating the snapshot management information to information that expresses the snapshot at the certain timing;

at a later timing than the certain timing, judging on the basis of the snapshot management information updated at the later timing in which of either the pre-updated data memory region or the first memory device the data constituting the data group at the certain timing exists and, by the acquisition and sending of the data from the one in which the data exists to the second storage subsystem, constructing the data group at the certain timing in the second memory device; and the repeated generation of the certain timing.

DESCRIPTION OF THE PREFERRED EMBODIMENTS

A description of a embodiment of the present invention is given below with reference to the diagrams.

Figure 1:
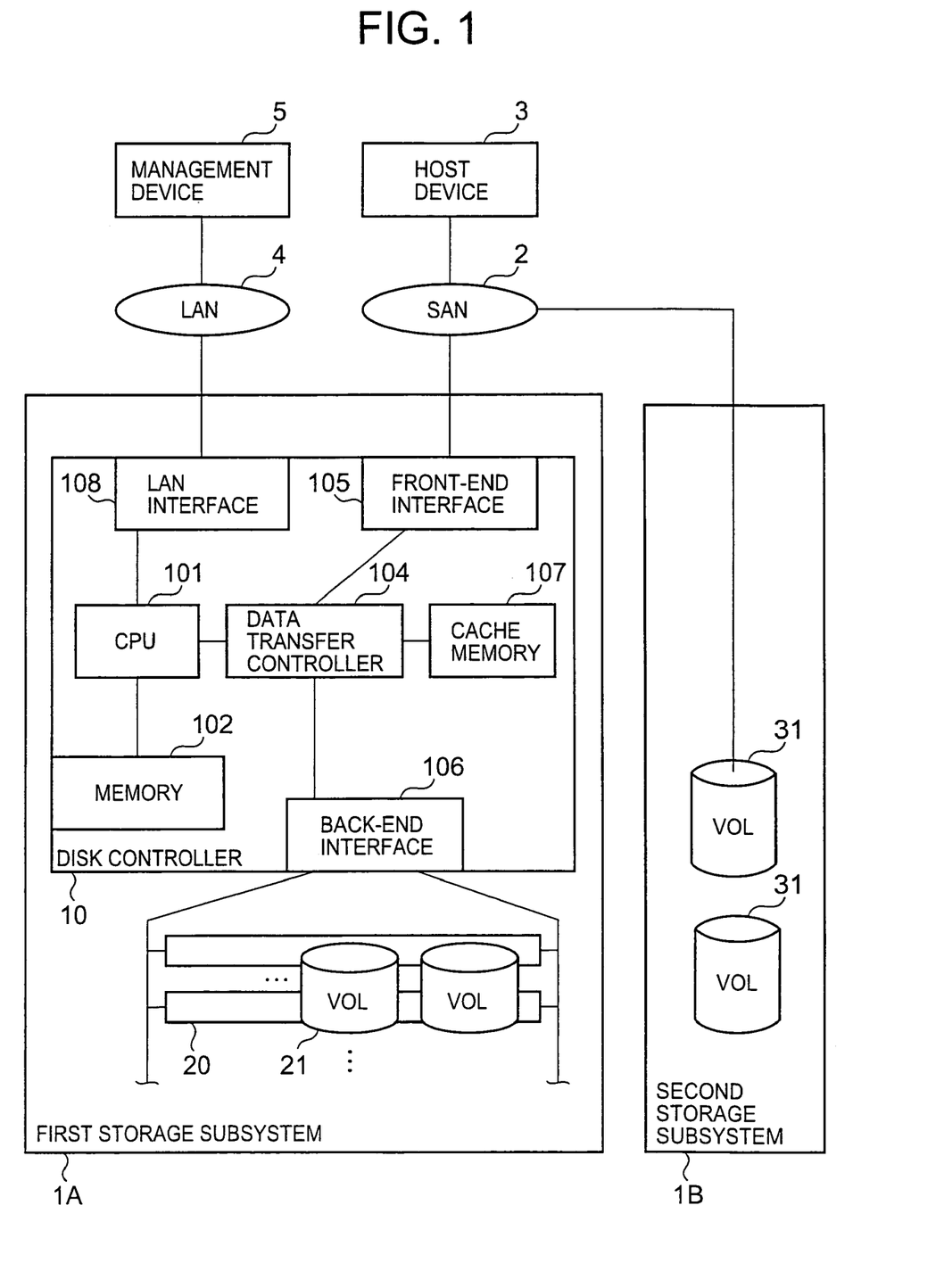
FIG. 1 illustrates a storage system pertaining to a first embodiment of the present invention.

FIG. 1 illustrates the storage system pertaining to one embodiment of the present invention.

A first storage subsystem 1A comprises a disk controller 10 and plurality of (or one) disk type memory devices 20. In addition, the first storage subsystem 1A is connected to a host device 3, device manager 5 and second storage subsystem 1B. More specifically, the first storage subsystem 1A is connected to the host device 3 and the second storage subsystem 1B by way of a SAN (Storage Area Network) 2, and is connected to the device manager 5 by way of a LAN (Local Area Network) 4.

The host device 3 is a computer device (by way of example personal computer) comprising hardware resources such as a CPU, memory and display device. The host device 3 can send read target data read requests or write requests and write target data to the first storage subsystem 1A.

The device manager 5 is a computer device (by way of example personal computer) comprising hardware resources such as a CPU, memory and display device. By way of example, the device manager 5 can operate management programs not shown in the diagram and, based on the management programs, can recognize the operational state of the storage system 1 and control the operation of the first storage subsystem 1A. It should be noted that client programs such as web browsers can be operated by the device manager 5, and the operation of the first storage subsystem 1A can be controlled by management programs supplied from the first storage subsystem 1A by means of a CGI (common Gateway Interface).

The host device 3, device manager 5 and second storage subsystem 1B may be connected to the first storage subsystem 1A by way of a common network, and the connection of each of the host device 3, device manager 5 and second storage subsystem 1B may be by way of exclusive lines. At least one of the first storage subsystem 1A and the second storage subsystem 1B can be formed as a RAID (Redundant Array of Independent Disks).

The disk controller 10 controls the input/output of data to the disk-type memory devices 20 (by way of example, a hardware disk). The disk controller 10 comprises, by way of example, a CPU 101, memory 102, data transfer controller 104, front-end interface 105, back-end interface 106, cache memory 107 and LAN interface 108.

A variety of information can be stored in the memory 102. More specifically, by way of example, a variety of computer programs (not shown in the diagrams) read into the CPU 101 and logical volume tables for the management of later-described logical volumes can be stored in the memory 102.

Data transmitted between the front-end interface 105 and the back-end interface 106 (in other words, data exchanged between the host device 3 and the disk-type memory devices 20) is temporarily stored in the cache memory 107.

The front-end interface 105, which is an interface for the SAN 2, implements the transmission of data and control signals with the host device 3 by means of, by way of example, a fiber channel protocol.

The back-end interface 106, which serves as an interface for the disk-type memory devices 20, implements the transmission of data and control signals with the disk-type memory devices 20 by means of, by way of example, a fiber channel protocol.

The data transfer controller 104 controls the transfer of data between the CPU 101, front-end interface 105, back-end interface 106 and cache memory 107. By way of example, the data transfer controller 104 transfers data that read and written in the disk-type memory devices 20 by way of the SAN 4 between the interfaces 105, 106 by way of the cache memory 107.

The LAN interface 108, which serves as an interface for the LAN 4, is able to implement the transmission of data and control signals with the device manager 5 by way of, by way of example, a TCP/IP protocol.

A plurality of (or one) logical volumes 21 that serve as logic memory devices are set in the plurality of disk-type memory devices 20.

The CPU 101, by retrieving and executing the computer programs stored in the memory 102, can execute a variety of processings. By way of example, where read requests are received from the host device 3, the CPU 101 can temporarily read into the cache memory 107 read target data written in the logical volumes 21, following which it can read the read target data from the cache memory 107 and send it to the host device 3. In addition, by way of example, where write requests and write target data are received from the host device 3, the write target data is temporarily stored in the cache memory 107 and the CPU 101, in accordance with the write requests, can write the write target data stored in the cache memory 107 into the logical volumes 21. In addition, the CPU 101 can execute a later-described quick internal copy processing, snapshot update processing and remote copy processing and so on.

The second storage subsystem 1B may be of an identical or different hardware configuration to the first storage subsystem 1A. The second storage subsystem 1B can comprise one or a plurality of logical volumes 21.

The description above provides a summary of the storage system pertaining to this embodiment. The storage system is described in detail below.

Figure 2A:
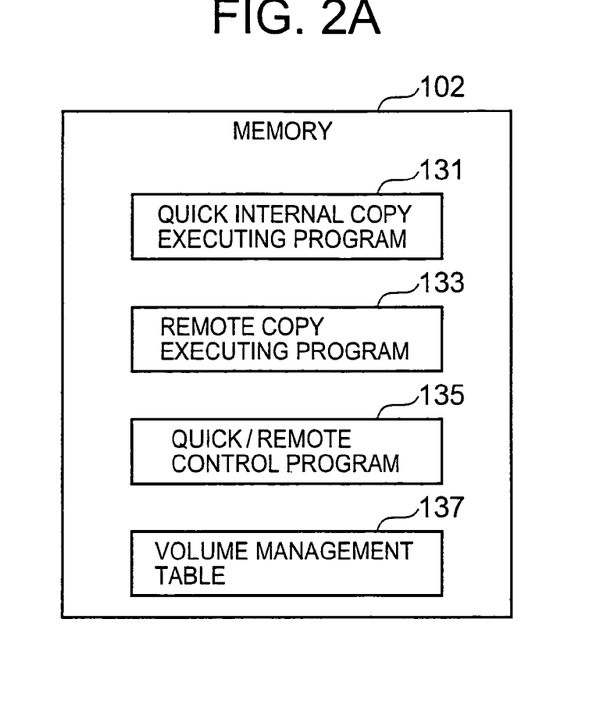
FIG. 2A illustrates one example of information stored in a memory 102.

FIG. 2A illustrates one example of the information stored in the memory 102.

By way of example, a quick internal copy executing program 131 for executing the later-described quick internal copy processing and snapshot update processing, a remote copy executing program 133 for executing remote copy processing, quick/remote control program 135 for controlling the quick internal copy executing program 131 and the remote copy executing program, and a first volume management table 137 (need not be a table format) in which information related to the plurality of logical volumes 21 is listed, are stored in the memory 102.

By the reading of the quick internal copy executing program 131, the remote copy executing program 133 and the quick/remote control program 135 into the CPU 101, the chain of the process flow, which is explained with reference to the later-described FIG. 4, can be actualized.

Figure 2B:
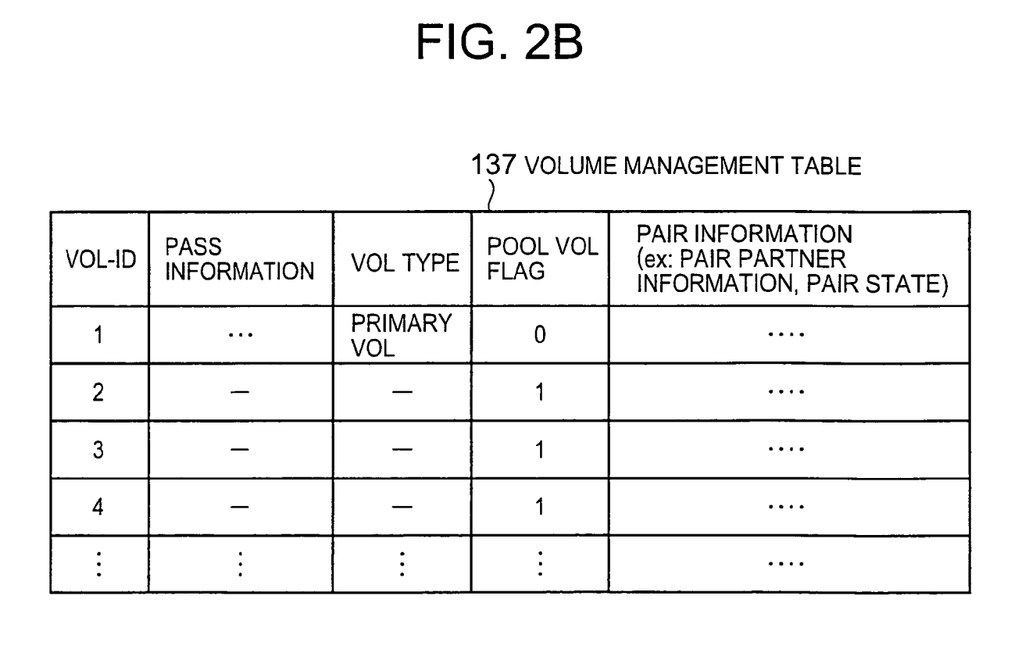
FIG. 2B illustrates an example configuration of a logical volume table 137.

FIG. 2B illustrates an example configuration of the first volume management table 137.

For each of the plurality of logical volumes 21, a VOL-ID for identifying the logical volumes (hereafter abbreviated to "VOL"), pass information that expresses an access pass to the logical volumes, the type of logical volume (hereafter VOL type), a flag that expresses whether the logical volume is pool VOL (hereafter pool VOL flag), and at least one information element related to the VOL pair containing the logical volumes (hereafter pair information) are stored in the logical volume table 137. At least one information element of the information stored in the logical volume table 137 (by way of example, VOL-ID, VOL type, setting of pool VOL flag) can be input from an external device such as a device manager 5 or a host device 3.

Examples of VOL type include "primary" and "secondary" (not shown in the diagram), and "pool" (although not shown in the diagram the pool VOL flag is "1"). The VOL type referred to as "primary" (hereafter primary VOL) is the VOL that constitutes the copy origin for the prescribed copy processing (by way of example, remote copy processing). The VOL type referred to as "secondary" (hereafter secondary VOL), which is the VOL that constitutes the copy destination of the prescribed copy processing (by way of example, remote copy processing), has a memory capacity the same as the primary VOL. The pass information of both the primary VOL and secondary VOL is defined. In contrast thereto, the pass information of the VOL type referred to as "pool" (hereafter referred to as pool VOL) is undefined. A detailed description of pool VOL is given below.

Pool VOL flag constitutes information that expresses whether or not corresponding logical volumes 21 are pool VOL or not. More specifically, by way of example, it is apparent that when the pool VOL flag is "1" (in other words, when it is UP) the corresponding logical volume 21 is a pool VOL, and that when the pool VOL flag is "0" (in other words, when it is DOWN) the logical volume 21 correspondent thereto is not a pool VOL.

Pair information includes, by way of example, pair partner information and the pair state. The pair partner information can include, by way of example, as information related to the logical volumes that form the pair partners (hereafter pair partner VOL), ID of the storage subsystem comprising the pair partner VOL, VOL-ID of the pair partner VOL, and pass information. The pair state includes, by way of example, a preparation state in which the pair partner VOL is in a reserved state (by way of example, state in which access to the pair partner VOL is prohibited), a copy state that expresses that the data within the pair source VOL is to be reproduced in the reserved pair partner VOL, and a split state that expresses that the pair partner VOL and pair origin VOL have been logically split and only the finite difference data prior to and following the updating of the pair origin VOL is to be coped to the pair partner VOL.

The CPU 101, by reference to the volume management table 137 as described above, can specify the type of VOL 21 that serves as the access target or the pair information. In addition, the CPU 101, where a pool VOL 21C has been allocated to a later-described virtual VOL, can define information that expresses pass to the pool VOL 21C, and can register this defined pass information in the volume management table 137. In addition, the CPU 101, by deleting the pass information of the unallocated pool VOL, can form the pool VOL as an unused state. The CPU 101 can, on the basis of whether or not pass information for a pool VOL has been registered, judge whether a pool VOL is being used or whether it is in the unused state.

Figure 3:
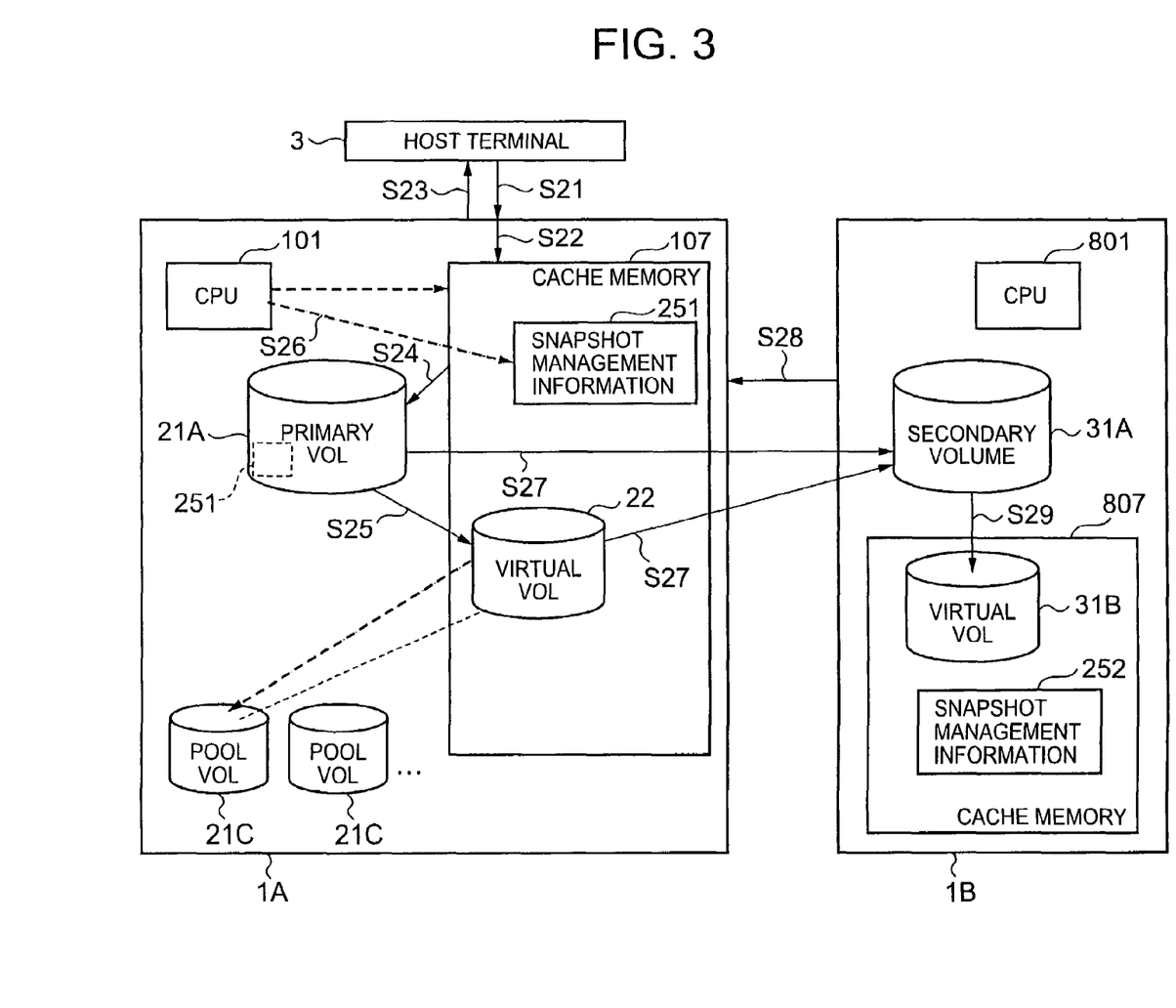
FIG. 3 is an explanatory diagram of non-synchronous remote copy implemented by the storage system pertaining to this embodiment.

FIG. 3 is an explanatory diagram of non-synchronous remote copy implemented by the storage system pertaining to this embodiment.

First, prior to the description of the process flow, a description will be given of the configuration and the function thereof.

A primary VOL 21A, virtual VOL 22, pool VOL 21C and snapshot management information 251 exist in the first storage subsystem 1A.

The virtual VOL 22 can be formed as a pair with the primary VOL 21A (and/or the later described secondary VOL 31A). The virtual VOL 22, which constitutes a virtually prepared logical volume, is logically prepared on a prescribed physical memory resource such as, by way of example, the cache memory 107 (it may be prepared on the disk-type memory device 20). The CPU 101 can select one or more pool VOL 21C from among the plurality of pool VOL 21C (by way of example, unused pool VOL 21C not correspondent to any VOL) in the virtual VOL 22, and can allocate a selected one or more pool VOL 21C to the virtual VOL 22. The CPU 101, where data is written in the virtual VOL 22, may write this data into the allocated pool VOL 21C or, using the virtual VOL 22 only, may store this data without writing it into the pool VOL 21C. The CPU 101, by increasing and decreasing the number of pool VOL 21C allocated to the virtual VOL 22 as appropriate in response to the conditions of consumption of the memory resources provided by the one or more pool VOL 21C, can increase or decrease the usable memory capacity.

The snapshot management information 251 is stored in a prescribed memory resource such as, by way of example, the cache memory 107. The snapshot management information 251 expresses a snapshot of a data group (to put it another way, a primary VOL 21A image) within the primary VOL 21A at a certain timing (to put it another way, at a certain point). The CPU 101, by reference to the snapshot management information 251, can judge for each data constituting the abovementioned data group at the certain timing in which of either the virtual VOL 22 (or pool VOL 21C) and primary VOL 21A this data exists and, by acquiring the data from the judged side, can restore the abovementioned data group at the certain timing to the prescribed memory resource (by way of example, primary VOL 21A or a separate VOL 21).

It should be noted that all or part of the snapshot management information 251 may be substituted or added to the cache memory 107 and written in the disk-type memory device 20 (by way of example, primary VOL 21A or so-called system VOL in which information for controlling the first storage subsystem 1A is written). Although, as described later, the snapshot management information 251 comprises, by way of example, a finite difference bit map 202, storage table 203 and snapshot management table 204, at least one of these information elements 202, 203 and 204 may be substituted or added to the cache memory 107 and stored in the disk-type memory device 20. More specifically, by way of example, the first storage subsystem 1A (by way of example, CPU 101) can copy all or part of the snapshot management information 251 stored in the disk-type memory device 20 to the cache memory 107 and, conversely, can copy all or part of the snapshot management information 251 stored in the cache memory 107 to the disk-type memory device 20. In addition, by way of example, the first storage subsystem 1A (by way of example, CPU 101), where all or part of a further snapshot management information 251 (by way of example, all or part of the information 251 in the cache memory 107) has been updated, can further reflect all or part (by way of example, copy all or the finite difference) of the snapshot management information 251 following updating at a prescribed timing (by way of example, immediately following updating or regularly or irregularly) to all or part of another snapshot management information 251 (by way of example, all or part of the information 251 in the disk-type memory device 20). By the provision of two copies of all or part of the snapshot management information 251 in this way, even if the information of one is unable to be read from one (by way of example, where there is damage to the cache memory 107), the information can be read from the other.

The CPU 101 can read the data existing in at least one of the virtual VOL 22 (or pool VOL 21C) and primary VOL 21A and transfer (more specifically, by way of example, send the data or write requests in which this data is written) it to the second storage subsystem 1B.

The second storage subsystem 1B comprises a CPU 801, cache memory 807, secondary VOL 31A, snapshot management information 252 that expresses a snapshot of a data group of the secondary VOL 31A at a certain timing, and a virtual VOL 32 that can be paired with the secondary VOL 31A. The snapshot management information 252 and the virtual VOL 32 can be prepared on the cache memory 807.

The data from the first storage subsystem 1A is written in the secondary VOL 31A by the CPU 801. In addition, the data that expresses the finite difference prior to and following updating of the secondary VOL 31A can be written in the virtual VOL 32 by the CPU 801. In addition, at this time, the CPU 801 can update the snapshot management information 252 to information that expresses a snapshot that expresses a data group of the secondary VOL 31B at a certain timing. That is to say, the CPU 801 can execute an identical processing to the CPU 101.

The CPU 101 can form the pair state between the primary VOL 21A and the virtual VOL 22 as a copy state. This can be implemented in accordance with a command from an external device such as a device manager 5 or host device 3, or it can be actively implemented without receipt of this command. In the abovementioned copy state the CPU 101 can execute normal copy processing. More specifically, by way of example, when a copy state is formed between the primary VOL 21A and virtual VOL 22 and write target data is written in the primary VOL 21A, the CPU 101 can synchronously (or non-synchronously) therewith write the write target data in the virtual VOL 22 or the pool VOL 21C allocated thereto.

In addition, the CPU 101 can form the pair state of the primary VOL 21A and the virtual VOL 22 as a split state. Although this can be implemented in accordance with, by way of example, a command from an external device such as a device manager 5 or host device 3, in this embodiment the first storage subsystem 1A (by way of example CPU 101) can be actively implemented without receipt of this command. The CPU 101, where the primary VOL 21A is updated from the formation of the primary VOL 21A and virtual VOL 22 in the pair state and beyond, executes quick internal copy processing and snapshot updating processing using the quick internal copy executing program 131 which has been read therein.

Where the primary VOL 21A and virtual VOL 22 have been formed in a split state and write target data and write requests have been sent from the host device 3, the storage system pertaining to this embodiment can implement the following processing.

That is to say, the first storage subsystem 1A receives write requests and write target data from the host device 3 (Step S21), and the write target data is written in the cache memory 107 (S22). Where write target data is written in the cache memory 107 (or primary VOL 21A), the first storage subsystem 1A sends a write completion notification to the host device 3 (S23).

The CPU 101 reads the write target data written in the cache memory 107 and writes the write target data in the primary VOL 21A (S24). At this time, the CPU 101 executes a quick internal copy processing. By way of example, the CPU 101 copies (by way of example, shifts) the pre-updated data which is data that has not yet been updated by the write target data and is data that is written in the primary VOL 21A from the primary VOL 21A to the virtual VOL 22 (S25). In accordance with this processing, the plurality of data constituting a data group of the primary VOL 21A at the point of formation into the split state (to put it another way, the point at which the abovementioned normal copy processing is stopped) is dispersed into the primary VOL 21A and the virtual VOL 22. Although the CPU 101 can store the pre-updated data that has been copied into the virtual VOL 22 in the allocated pool VOL 21C, in this embodiment the pre-updated data is not shifted to the pool VOL 21C and is stored in the cache memory 107. This is because in remote copy processing pre-updated data can be more quickly acquired from the cache memory 107 than the disk-type memory device 20 in which the pool VOL 21C exists.

In addition, when quick internal copy processing is implemented the CPU 101 executes a snapshot update processing. More specifically, the CPU 101, in accordance with the updating of the primary VOL 21A that results from the writing of the write target data in the primary VOL 21A, updates the snapshot management information 251 to information that expresses a snapshot of a data group of the primary VOL 21A at the point of formation into the split state (to put it another way, the state in which the abovementioned normal copy has been stopped) (S26). To put it another way, the image of the primary VOL 21A at the point of splitting can be logically held in the virtual VOL 21A by the updating of the snapshot management information 251.

The CPU 101 repeatedly executes the processing of the Steps S22 to S26 to the extent that S21 is implemented in the abovementioned split state.

The CPU 101, in the abovementioned split state and at a prescribed or arbitrary timing following the point of formation into the split state (hereafter the point of splitting), executes remote copy processing by, using a read quick/remote control program 135, executing a remote copy executing program 133. More specifically, by the control of the quick/remote control program 135, the quick internal copy executing program 131 delivers the snapshot control information 151 to the remote copy executing program 133. The snapshot control information 151 expresses information for restoring a data group of the primary VOL 21A at the point of formation into the split state or, more specifically, by way of example, where the data that existed in the primary VOL 21A at the point of splitting is and where updating of the primary VOL 21A from the point of splitting and beyond has occurred. The remote copy executing program 133, in accordance with the delivered snapshot management information 151, judges in which of the virtual VOL 22 or primary VOL 21A the data from which the abovementioned data group were configured at the point of splitting exists, and acquires the data from the judged side and sends it to the secondary storage subsystem 1B (S27). Based on this, the abovementioned data group at the point of splitting is stored in the secondary VOL 31A and, as a result, the abovementioned data group at the abovementioned point of splitting is constructed in the secondary VOL 31A.

The second storage subsystem 1B can provide notification of write completion at a prescribed or arbitrary timing (by way of example, at the point in which the data is written in the cache memory 807 or the secondary VOL 31A) following the receipt of data from the first storage subsystem (S28).

Thereafter, where data has been received from the first storage subsystem 1A and the received data has been written in the secondary VOL 31A, the CPU 801 of the second storage subsystem 1B can write separate pre-updated data, which constitutes data that has not yet been updated by this data and is data that is written in the secondary VOL 31A, in the virtual VOL 32 (S29). In addition, at this time, the CPU 801 can update the snapshot management information 252 to information that expresses a snapshot of a data group within the secondary VOL 31A (by way of example, the image within the secondary VOL 31A at the abovementioned point of splitting).

Figure 4:
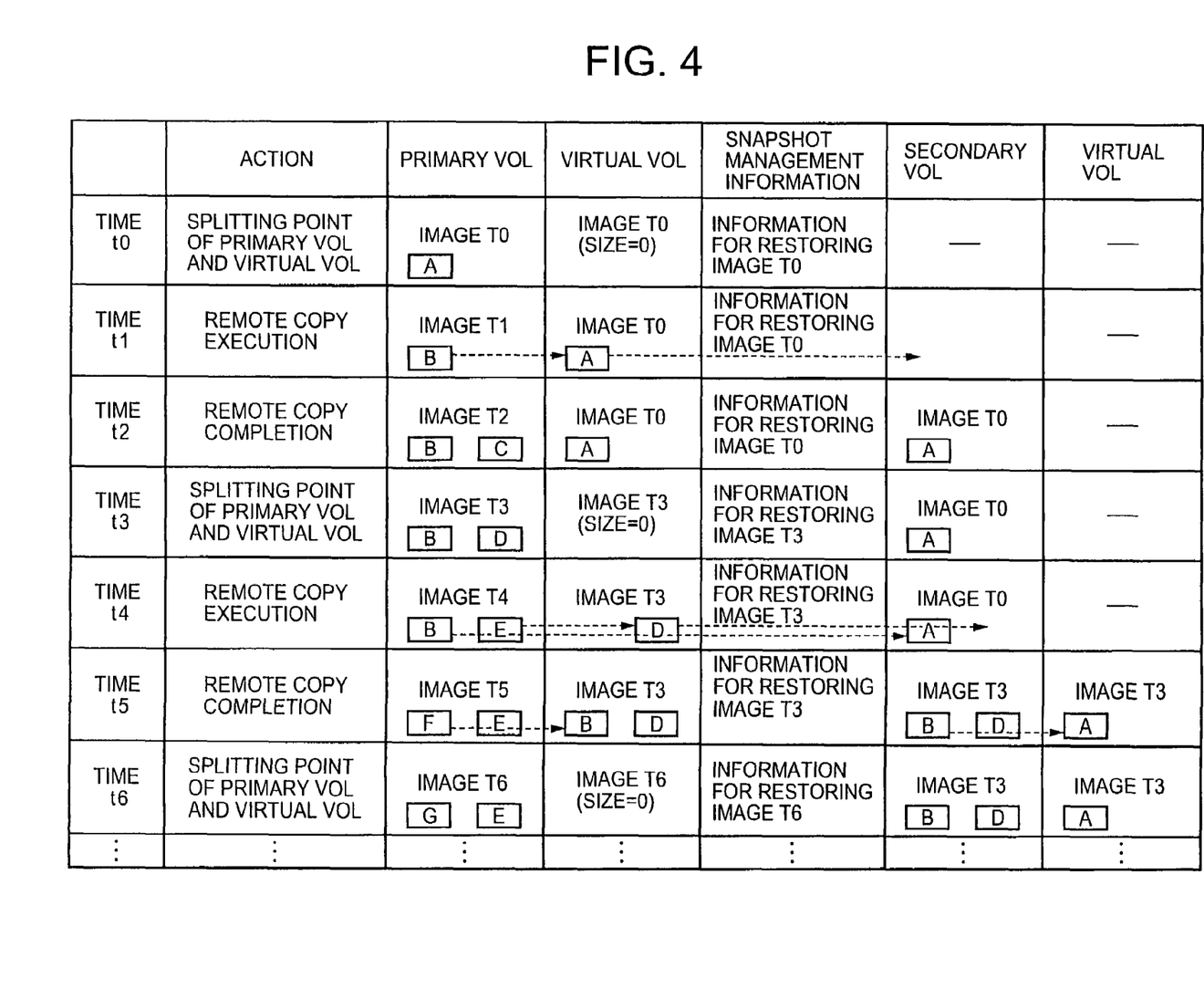
FIG. 4 is an explanatory diagram of an example the process flow pertaining to one main part of this embodiment.

FIG. 4 is an explanatory diagram of one example of the processing flow pertaining to one main part of the embodiment.

Both the primary VOL 21A and the secondary VOL 31A are configured from a plurality of block regions comprising a first block region and a second block region.

By way of example, a time t0 constitutes the point at which the primary VOL 21A and the virtual VOL 22 are formed in the split state (by way of example, the point at which a command for formation into the split state has been issued). The image of the primary VOL 21A at the point t0 is taken as "image T0". The image T0 is used to form an image in which a data block A is stored in a first block region of the primary VOL 21A. At the time t0 there is no pre-updated data stored in the virtual VOL 22. The snapshot management information 251 constitutes information for the restoring of the image T0.

When a data block B is overwritten on the first block region of the primary VOL 21A at a time t1 (in other words, during the split state period), the image of the primary VOL 21A changes from the image T0 to an image T1. In this case, the quick internal copy executing program 131 writes the pre-updated data block A from the primary VOL 21A into the virtual VOL 22. At this time, the quick internal copy executing program 131, in an updating of the first block region of the primary VOL 21A, updates the snapshot management information 251 to information that expresses that the pre-updated data block A that existed in the first block region is stored in the virtual VOL 22.

In addition, at the time t1, the local/remote control program 135 instructs the remote copy executing program 133 to execute remote copy processing, whereupon the updated snapshot management information 251 is delivered to the remote copy executing program 133 (or the remote copy executing program 133 is told of the location in which the information 251 exists). The remote copy executing program 133, by referring to the snapshot management information 251, specifies that the data block A from which the image T0 is configured exists in the virtual VOL 22, acquires the data block A from the virtual VOL 22, and sends the acquired data block A to the second storage subsystem 1B.

The time t2 represents the time at which the remote copy processing has been completed. As a result, the image T0 of the primary VOL 21A at the time t0 has been reproduced in the secondary VOL 31A.

In addition, when a data block C is written in the second block region of the primary VOL 21A at the time t2 (in other words, during the split state period), the image of the primary VOL 21A changes from the image T1 to the image T2. In this case, the quick internal copy executing program 131 updates the snapshot management information 251 to information that expresses that updating has occurred at the second block region of the primary VOL 21A.

By way of example, where a data block D is overwritten on a second block region of the primary VOL 21A following the time t2 and prior to time t3, the image of the primary VOL 21A changes from an image T2 to an image T3 (image in which a data block B exists in the first block region and the data block D exists in the second block region). In this case, the quick internal copy executing program 131 writes a pre-updated data block C from the primary VOL 21A to the virtual VOL 22. At this time, the quick internal copy executing program 131 updates the snapshot management information 251 to information that expresses that the pre-updated data block C existing in the second block region is stored in the virtual VOL 22 which constitutes the updating of the second block region of the primary VOL 21A.

Following this, and prior to the updating of the primary VOL 21A, the primary VOL 21A and virtual VOL 22 are again formed into a split state at the time t3. By way of example, the release of the split state and reformation of the split state may be implemented using a single command (in other words, the release and initiation of the split state may be formed essentially simultaneously) or, following the temporary release of the split state by a first command, the split state may be reformed again by a second command.

At the time t3 point or, to put it another way, where the abovementioned split state has been formed, the CPU 101 (by way of example quick internal copy executing program 131), in order to logically hold the image T3 of the primary VOL 21A in the virtual VOL 22 at the time t3, deletes all pre-updated data stored in the virtual VOL 22. As a result, the pre-updated data can be removed from the virtual VOL 22 and the free capacity of the cache memory 107 can be increased. It should be noted that, where it has been judged from the snapshot management information 251 that pre-updated data exists in the pool VOL 21C, the CPU 101 can delete the pre-updated data from the pool VOL 21C. The CPU 101 can form the pool VOL 21C from which the pre-updated data has been deleted in a non-usage state (allocatable state, in other words, a selectable state).

In addition, the CPU 101 updates the snapshot management information 251 to information for restoring the image T3 from information for restoring the image T0. More specifically, by way of example, by virtue of the fact that a state exists at the time t3 in which updating of the primary VOL 21A has still not been implemented, the CPU 101 updates the snapshot management information 251 to information that expresses that the updating at the primary VOL 21A has not been implemented.

Where a data block E is overwritten on the second block region of the primary VOL 21A at a time t4, the image of the primary VOL 21A changes from the image T3 to an image T4. In this case, the quick internal copy executing program 131 writes the pre-updated data block D from the primary VOL 21A into the virtual VOL 22. At this time, the quick internal copy executing program 131, in an updating of the second block region of the primary VOL 21A, updates the snapshot management information 251 to information that expresses that the pre-updated data block D that exists in the second block region is stored in the virtual VOL 22.

Remote copy processing is implemented at the time t4. The remote copy executing program 133 can, by referring to the update snapshot management information 251, specify that the data block B from which the image T3 is configured exists in the primary VOL 21A from the fact that the first block region of the primary VOL 21A has not been updated and, from the fact that the second block region of the primary VOL 21A has been updated, can specify that the separate data block D from which the image T3 is configured exists in the virtual VOL 22. The remote copy executing program 133 acquires the data block B from the primary VOL 21A, acquires the data block D from the virtual VOL 22, and sends the acquired data blocks B and D to the second storage subsystem 1B.

A time t5 represents the point at which the remote copy processing has been completed. As a result, the image T0 of the secondary VOL 31A has been updated to the image T3 of the primary VOL 21A at the time t3. More specifically, the data block B has overwritten the data block A of the first block region of the secondary VOL 31A, and the data block D has been written in the second block region. It should be noted that, beyond this, the image T3 can be held in the second storage subsystem 1B until the data from which the image T6 of the next split time t6 is configured has been received.

After this, the abovementioned processings implemented at time t3 to time t5 are repeated.

That is to say, in the first storage subsystem 1A, the primary VOL 21A and virtual VOL 22 are regularly or irregularly formed into a split state. In addition, the remote copy processing is implemented throughout the formation of the split state until the formation of the next split state (to put it another way, in parallel with the quick internal copy processing and the snapshot update processing). Beyond the point at which the remote copy processing has been completed the primary VOL 21A and virtual VOL 22 are formed again in a split state and, at this time, the snapshot management result is discarded (by way of example, pre-updated data is deleted from the virtual VOL 22). By the repetition of this processing in this way, images (in FIG. 4 the image T0 at the time t0, the image T3 at time t3 and the image T6 at time t6) in the primary VOL 21A at the initial point of formation of the irregularly or regularly formed split state (to put it another way, at the point of separation into the split state) can be logically held in the virtual VOL 22 and the image thereof can be copied to the secondary VOL 31A.

Figure 5:
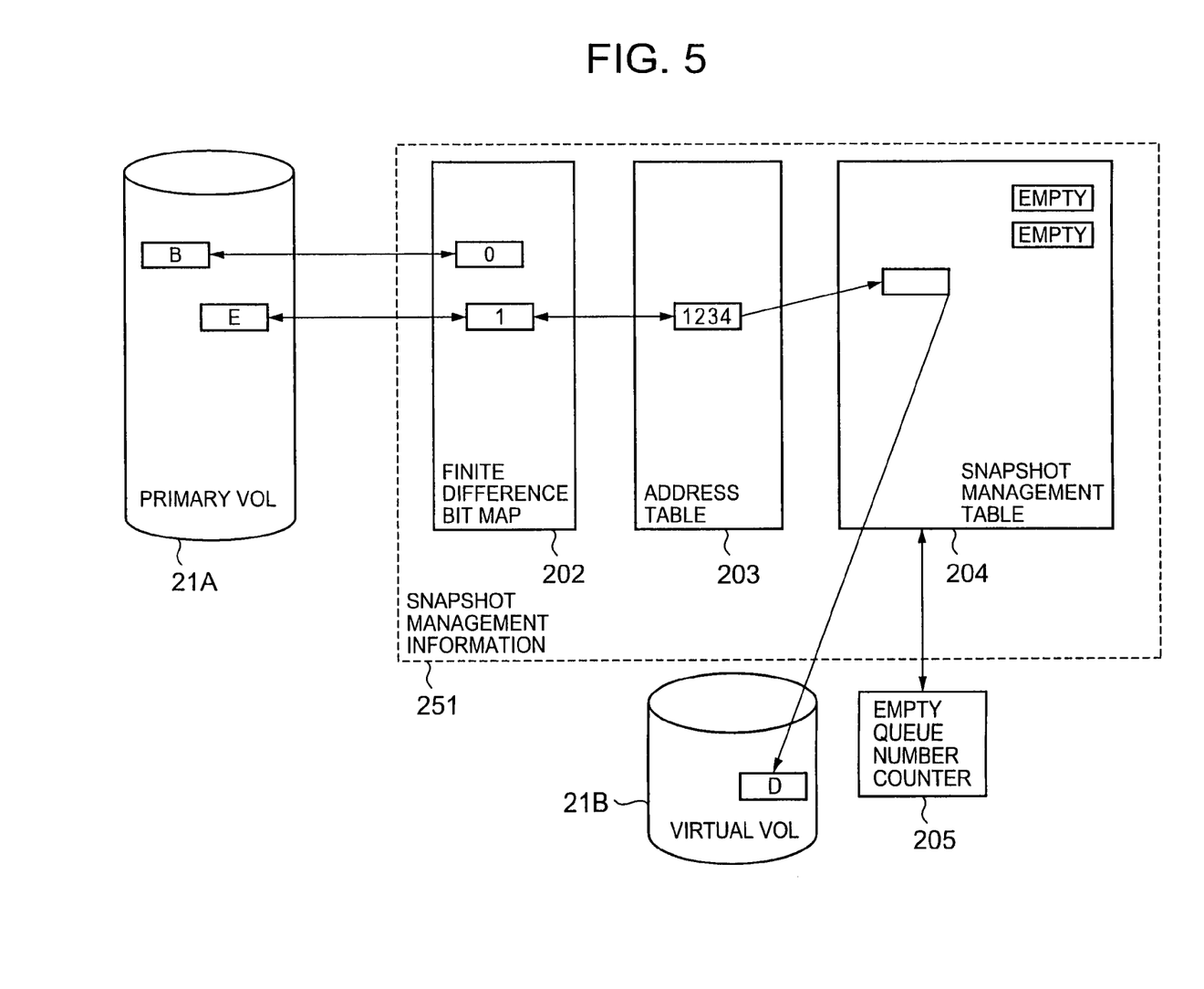
FIG. 5 is an explanatory diagram of a snapshot management method of this embodiment.

FIG. 5 is an explanatory diagram of the method of snapshot management of this embodiment.

FIG. 5 illustrates the change in the image of the primary VOL 21A of FIG. 4 from the image T3 to the image T4 using, as an example, the event in which the image T3 is logically held by the virtual VOL 22.

The snapshot management information 251 contains, by way of example, a finite difference bit map 202, address table 203 and snapshot management table 204.

The finite difference bit map 202, which is provided in the cache memory 107, comprises a plurality of bits each corresponding to a plurality of block regions of the primary VOL 21A (by way of example, 1 block region of 64 k/bytes). By way of example, by virtue of the fact that, where the alteration from the image T3 to the image T4 occurs the first block region of the primary VOL 21A is, as shown in the diagram, not yet updated, the bit corresponding to the first block region remains as "0" and, by virtue of the fact that the data block D overwrites the data block D of the second block region, the bit corresponding to the block region changes from "0" to "1".

The address table 203 comprises address regions each corresponding to a plurality of block regions of the primary VOL 21A. Provided-pre-updated data (to put it another way, finite difference data) corresponding to a certain block region exists, the addresses of the regions of the snapshot management table 204, which constitute addresses corresponding to the address regions, will be stored in address regions corresponding to certain block regions.

The snapshot management table 204 comprises, by way of example, management regions corresponding to each of the plurality of block regions of the virtual VOL 22 (or pool VOL 21C). Which generation of snapshot data the pre-updated data stored in positions corresponding to the block regions of the virtual VOL 22 exists in is stored in these management regions. The pre-updated data of a plurality of generations can be acquired by a search of these management regions in accordance therewith. It should be noted that regions of the management table 204 not in use can be formed as empty queues. The empty queues can be managed by an empty queue counter 205 provided in the cache memory 107.

The image of the primary VOL 21A at the point of snapshot production can be logically copied by means of the virtual VOL 22. Which generation of pre-updated data the data of the virtual VOL 22 exists in can be specified by the snapshot management table 204.

Figure 6:
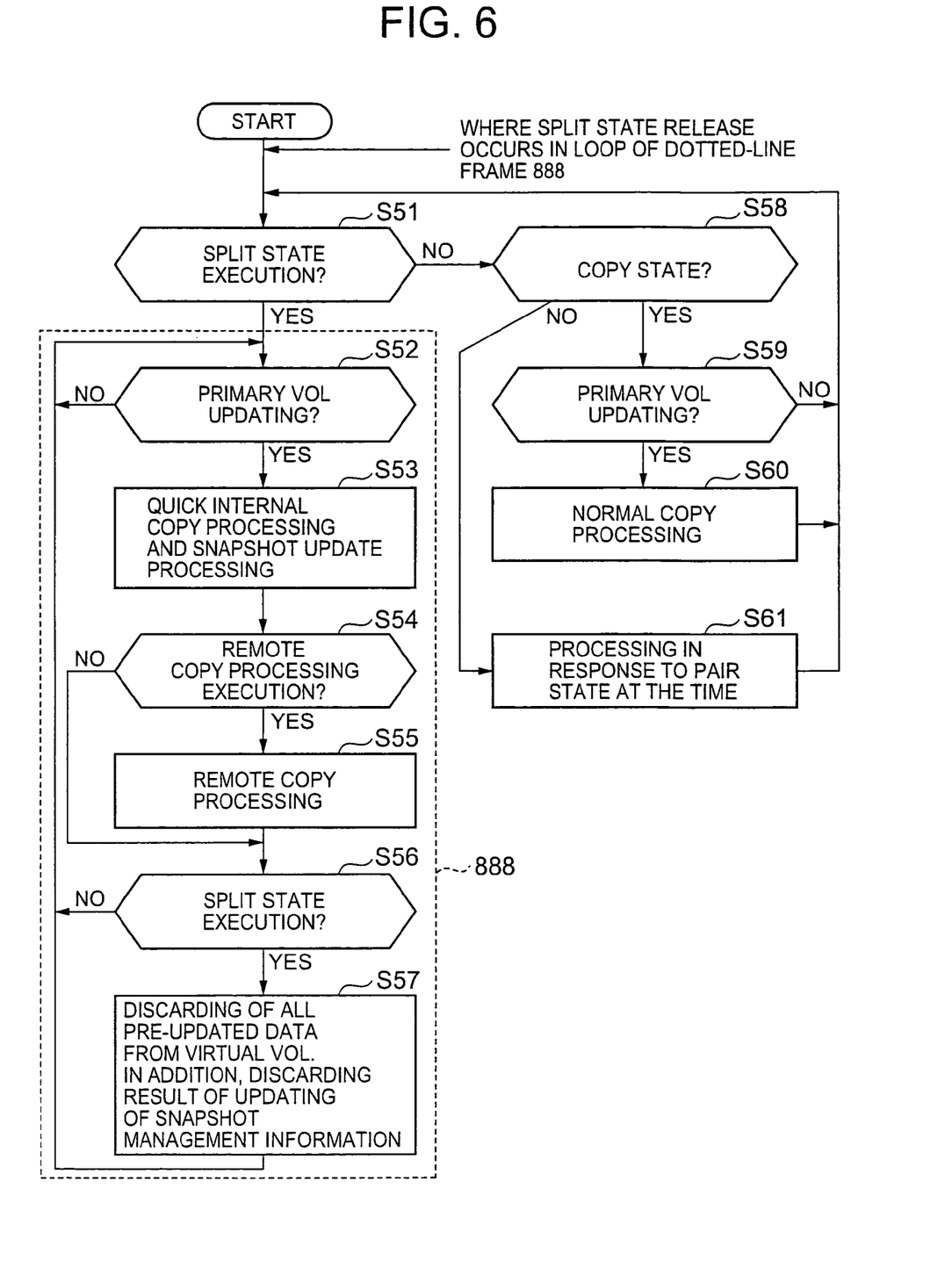
FIG. 6 illustrates the entire flow including when the split state is initiated and when remote copy is executed.

FIG. 6 illustrates one example of the entire process flow implemented by the storage system pertaining to this embodiment.

The primary VOL 21A and virtual VOL 22 can be formed in a split state internally by the execution by the CPU 101 of a command for the initiation of the split state, and this can be registered in the logical volume table 137. Where, as a result, the split state is initiated (YES in S51) and, thereafter, new data is written in the primary VOL 21A (YES in S52), providing the existing data is updated by this new data the internal copy processing and the snapshot update processing will be implemented (S 53).

The processing of YES in S52 and S53 is repeated at least until, during the split state period beyond the YES of S51, remote copy processing is executed (NO in S54).

Provided the remote copy processing is executed (by way of example, provided this is executed in a prescribed time or a remote copy executing command from an external device such as a host device 3 is received) during this period (YES in S54), remote copy processing will be executed in accordance with the snapshot management information 251 (S55).

Following the completion of the remote copy processing (by way of example, following the transfer of the data that constitutes the target for the remote copy processing to the second storage subsystem 1B and the receipt of a write completion notification from the subsystem 1B), provided a split state is again initiated (YES in S56), all pre-updated data stored in the virtual VOL 22 ((and/or) pool VOL 21C) will be discarded and, in addition, the updated result of the snapshot management information 251 will be discarded (S57). That is to say, both the virtual VOL 22 and the snapshot management information 251 serve as contents that express the image of the primary VOL 21A at the point at which the split state is again initiated.

Thereafter, the processing of S52 to S57 is repeated. That is to say, the loop shown by the dotted-line frame 888 is formed. By way of example, if a release from the split state occurs within this loop the processing will withdraw from the loop and S51 will be initiated. FIG. 4 described above expresses one example of the processing contents of the loop of the dotted-line frame 888.

The split state is not initiated in S51 (NO in S51) and, by way of example, provided the pair state between the primary VOL 21A and virtual VOL 22 is a copy state (YES in S58), the above-described normal copy processing will be executed (S60) in accordance with the updating of the primary VOL 21A (YES in S59).

In addition, even if the pair state between the primary VOL 21A and virtual VOL 22 is neither a split state nor a copy state (NO in S58 and NO in S51), the processing will be executed in accordance with the pair state that exists at that time (S61).

Based on the embodiment as described above, beyond the formation of the primary VOL 21A and virtual VOL 22 in the split state, provided the existing data is updated by the new data to that extent that new data is written in the primary VOL 21A, the pre-updated data (in other words, the existing data) will be written in the virtual VOL 22 and, in addition, where in the primary VOL 21A the updating has occurred and where the pre-updated data exists and so on will be written in the snapshot management information 251. That is to say, beyond the formation of the virtual VOL 22 and the primary VOL 21A in the split state, the image of the primary VOL 21A at the point of initiation of the split state will be held in the first storage subsystem 1A no matter how much new data is written in the primary VOL 21A. Based on the snapshot management information 251 that expresses the image at the time of initiation of the split state (to put it another way, the snapshot), a judgment is made as to in which of either the primary VOL 21A or the virtual VOL 22 the data from which the image at the time of initiation of the split state exists, the data is read from the judged side and transferred to the second storage sub-system 1B and this transferred data is then stored in the secondary VOL 21B provided therein. The processing described above is repeated in accordance with the regular or irregular repetition of the split state initiation. By virtue of this, not all images of the primary VOL 21A but only the image at the time of the initiation of the split state is held in the first storage sub-system 1A, and the held image is reproduced in the second storage subsystem 1B. By virtue of the fact that, accordingly, the load inherent to snapshot production and non-synchronous remote copy can be suppressed, even if neither the capacity of the memory resource of the first storage system 1A (by way of example, cache memory) nor the processor performance is very good, the deterioration of the processing speed of the first storage subsystem 1A as a whole can be suppressed.

In addition, based on the embodiment described above, all pre-updated data stored in the virtual VOL 22 beyond the time of initiation of the $N^{th}$ (by way of example $N \geq 1$) split state is deleted from the virtual VOL 22 at the time of initiation of the $N+1^{th}$ split state. By virtue of this, savings of the consumed memory capacity in the cache memory 107 can be achieved.

In addition, based on the embodiment described above, a virtual VOL 32 that can be paired with the secondary VOL 31A is prepared at the remote side, and the pre-updated data of the secondary VOL 31A is stored in the virtual VOL 32. In addition, the images of the secondary VOL 31A are processed in accordance with the snapshot management information 252. By virtue of this, if link errors occur in data transfer in which, by way of example, the data sequence is not guaranteed and the data within the secondary VOL cannot be used, by virtue of the fact that the images of the secondary volume VOL 31A can be restored in accordance with the snapshot management information 252 and the virtual VOL 32, damage can be averted.

Although the description given above is of an ideal embodiment of the present invention, this represents one example only used to described the present invention and should not imply that the scope of the invention is restricted to this embodiment. The present invention can be executed in a range of other modes.

By way of example, the first sub-storage system 1A can hold both the time (by way of example, year-month-day-hour-minute-seconds) at each point of updating of the primary VOL 21A and the history corresponding to the various conditions at each time of updating (by way of example, pair state between the primary VOL 21A and virtual VOL 22, existence of error, contents of error and so on) in a prescribed memory region (by way of example, the memory 102 or cache memory 107), and the history can be provided to an external device (by way of example, management device 5 or host device 3) that is communicably connected to the first storage subsystem 1A. By virtue of this, the history can be viewed on a display screen provided in the external device.

In addition, by way of example, the pre-updated data may be shifted from the virtual VOL 22 to the pool VOL 21C and deleted from the virtual VOL 22 throughout the abovementioned split state period.

In addition, by way of example, the first storage subsystem 1A and the second storage subsystem 1B need not be restricted to the respective hardware configurations described above, and other configurations thereof may be adopted. More specifically, by way of example, a configuration comprising a plurality of adaptors serving a function the same as the front-end interface 105 or a plurality of adaptors serving a function the same as the back-end interface 106 in which, in each adaptor, a plurality of microprocessors for controlling the adaptors are mounted may be adopted.

In addition, by way of example, the CPU 101 may delete all non-updated data stored in the virtual VOL 22 (and/or pool VOL 22) not only when the split state is initiated but also when the remote copy (by way of example, at the time t5) is completed.

In addition, by way of example, although this may have been described above, the pair state can be autonomously changed by the CPU 101, or it can be implemented in accordance with an instruction from an external device (by way of example, host device 3 and device manager 5).

In addition, by way of example, in FIG. 4, the intervals between the times t0, t3, t6, . . . at which the split state is initiated may be either fixed or not fixed. In addition, schedule information in which the schedule of the timings for the initiation of the split state and the timings for the execution of remote copy are expressed may be registered in a prescribed memory region (by way of example memory 102), whereupon the CPU 101 may control the establishment of when the split state is initiated and when the remote copy is executed in accordance with this schedule information. The timing information registered in the schedule information may comprise, by way of example, the time itself, or an elapsed time from the initiation of a previous split (by way of example, immediately previous) state.

In addition, by way of example, at least one of the first storage subsystem 1A and the second storage subsystem 1B may implement a control that pertains to the manner in which the logical volumes they hold are indicated to the external device (by way of example, a host device or device manager). By way of example, the first storage system 1A may implement a control in which, although the image of the primary VOL 21A is displayed in an external device (by way of example, the host device 3), the image of the virtual VOL 22 is not displayed.

In addition, by way of example, throughout the same split state period, the snapshot production timing (by way of example, the issue of the snapshot production command) and the remote copy processing period (period from initiation to completion) may be repeated.

What is claimed is:

1. A first storage subsystem of a storage system, said storage system comprising the first storage subsystem and a second storage subsystem, said first storage subsystem comprising:

a first memory device, wherein said second storage subsystem comprises a second memory device, and wherein the first storage subsystem is communicably connected to a host device for sending write target data and is communicably connected to said second storage subsystem;

means for writing write target data from said host device in said first memory device;

a snapshot memory region for storing snapshot management information that expresses a snapshot of a data group within said first memory device at a certain timing;

a pre-updated data memory region for storing data that constitutes data prior to update by the write target data and constitutes data that has been written in said first memory device;

pre-updated data write means for, beyond the certain timing and when write target data has been written in said first memory device, writing said pre-updated data in said pre-updated data memory region;

snapshot updating means for, beyond said certain timing and when write target data has been written in said first memory device, updating said snapshot management information to information that expresses said snapshot at said certain timing;

remote copy means for determining, at a later timing after said certain timing, and with reference to snapshot management information updated at said later timing, in which of either said pre-updated data memory region or said first memory device the data constituting said data group at said certain timing exists, and constructing said data group at said certain timing in said second memory device by acquiring the data from one of said pre-updated data memory region or said first memory device in which it is determined that the data exists, and sending the data to said second storage subsystem;

timing generating means for repeatedly generating said certain timing, wherein said pre-updated data memory region is a third memory device that can be configured as a pair with said first memory device, wherein said first storage subsystem comprises local copy means for, in a case where the pair state of said first memory device and said third memory device is a first state, writing the write target data in not only said first memory device but also said third memory device, and wherein said timing generating means repeatedly generates said certain timing by making said pair state a second state;

a first type logical volume, provided in a physical memory device, for which no specific attributes are set; and a plurality of second type logical volumes, provided in a physical memory device, for which specific attributes are set, wherein said first memory device and said second memory device constitute said first type logical volume, wherein said third memory device constitutes a virtual logical volume configured from at least one of the second type logical volumes, and wherein said local copy means, by writing said write target data in a second type logical volume of said plurality of second type logical volumes that has a free space, writes said write target data in said virtual logical volume.

2. The first storage subsystem according to claim 1, further comprising:

means for, when said certain timing has been generated again, deleting all pre-updated data stored in said pre-updated data memory region.

3. The first storage subsystem according to claim 1, further comprising:

a cache memory for temporary storage of said write target data exchanged between said host device and said first memory device, wherein said pre-updated data memory region is provided in said cache memory.

4. The first storage subsystem according to claim 1, wherein said pre-updated data memory region is provided in the first memory device.

5. The first storage subsystem according to claim 1, further comprising:

a cache memory for the temporary memory of said write target data exchanged between said host device and said first memory device, wherein all or part of said snapshot management information is stored in at least one of said cache memory and the first memory device.

6. The first storage subsystem according to claim 1, further comprising:

a cache memory for temporary storage of said write target data exchanged between a host device for sending write requests and write target data and said first memory device;

at least one computer; and a program memory region in which one or more computer programs are stored for, by being read by said at least one computer, actuating said at least one computer, wherein said pre-updated data memory region is provided on said cache memory, and wherein said at least one computer which reads said one or more computer programs:

(1) receives write requests and write target data from said host device;

(2) writes said received write target data in said first memory device in accordance with said received write requests;

(3) from said certain timing onward, in addition to the processing of said (2), every time said processing of (1) is implemented, repeats (4) to (7) below;

(4) writes said pre-updated data in said cache memory;

(5) updates said snapshot management information to information that expresses said snapshot at said certain timing in accordance with the updating of said first memory device by the writing of said write target data in said first memory device;

(6) determines, at a later timing after said certain timing, and with reference to the snapshot management information updated at said later timing, in which of either said cache memory or said first memory device the data constituting said data group at said certain timing exists, and constructs said data group at said certain timing in said second memory device by the acquisition of the data from the one of said cache memory or said first memory device in which it is determined that the data exists, and sending the data to said second storage subsystem; and (7) repeatedly generates said certain timing.

7. The first storage subsystem according to claim 6, wherein said at least one computer deletes all pre-updated data from said cache memory when said certain timing occurs again.

8. The first storage subsystem according to claim 7, wherein said timing generating means regularly or irregularly execute events for the generating of the certain timing.

9. A first storage subsystem of a storage system, said storage system comprising the first storage subsystem and a second storage subsystem, said first storage subsystem comprising:

a first memory device, wherein said second storage subsystem comprises a second memory device, and wherein said first storage subsystem is communicably connected to a host device for sending write target data and is communicably connected to said second storage subsystem;

means for writing write target data from said host device into said first memory device;

a snapshot memory region for storing snapshot management information that expresses a snapshot of a data group within said first memory device at a certain timing;

a pre-updated data memory region for storing data that constitutes data prior to update by the write target data and constitutes data that has been written in said first memory device;

pre-updated data write means for, beyond the certain timing when write target data is written in said first memory device, writing said pre-updated data in said pre-updated data memory region;

snapshot updating means for, beyond said certain timing when the write target data is written in said first memory device, updating said snapshot management information to information that expresses said snapshot at said certain timing;

remote copy means for determining, at a later timing after said certain timing, and with reference to the snapshot management information updated at said later timing, in which of either said pre-updated data memory region or said first memory device the data constituting said data group at said certain timing exists, and acquiring the data from one of said pre-updated data memory region or said first memory device in which it is determined that the data exists, and sending the data to said second storage subsystem; and timing generating means for repeatedly generating said certain timing, wherein said second storage subsystem comprises means for constructing said data group at said certain timing in said second memory device by writing of the data received from said first storage subsystem into said second memory device, wherein said second storage subsystem comprises:

a separate snapshot memory region for storing a separate snapshot management information that expresses a snapshot of a data group within said second memory device;

a separate pre-updated memory region for storing separate pre-updated data that constitutes data prior to update by the data from said first storage subsystem and constitutes data that has been written in said second memory device;

pre-updated data write means for, when data from said first storage subsystem is written in said second memory device, writing said separate pre-updated data in said separate pre-updated memory region; and separate snapshot updating means for, when the data from said first storage subsystem is written in said second memory device, updating said snapshot management information.

10. A storage control method implemented in a storage system, said storage system comprising a first storage subsystem and a second storage subsystem, said first storage subsystem comprising a first memory device, and said second storage subsystem comprising a second memory device, wherein, said first storage subsystem is communicably connected to a host device for sending write target data, and is communicably connected to said second storage subsystem, said storage control method comprising:

beyond a certain timing, writing write target data sent from said host device into said first memory device;

beyond said certain timing and when the write target data is written in said first memory device, writing pre-updated data of said write target data in a pre-updated memory region, wherein said pre-updated data memory region stores data that constitutes data prior to update by the write target data and constitutes data that has been written in said first memory device;

beyond said certain timing and when the write target data is written in said first memory device, updating snapshot management information to information that expresses said snapshot at said certain timing, wherein said snapshot management information expresses a snapshot of a data group within said first memory device and is stored in a snapshot memory region at said certain timing;

determining, at a later timing after said certain timing, and with reference to the snapshot management information updated at said later timing, in which of either said pre-updated data memory region or said first memory device the data constituting said data group at said certain timing exists, and constructing said data group at said certain timing in said second memory device by the acquisition of the data from one of said pre-updated data memory region or said first memory device in which it is determined that the data exists, and sending the data to said second storage system;

repeatedly generating said certain timing, wherein said pre-updated data memory region is a third memory device that can be configured as a pair with said first memory device, and wherein said first storage subsystem comprises local copy means for, in a case where the pair state of said first memory device and said third memory device is a first state, writing the write target data in not only said first memory device but also said third memory device;

repeatedly generating said certain timing by making said pair state a second state;

providing in a physical memory device a first type logical volume, for which no specific attributes are set; and providing in a physical memory device a plurality of second type logical volumes, for which specific attributes are set, wherein said first memory device and said second memory device constitute said first type logical volume, wherein said third memory device constitutes a virtual logical volume configured from at least one of the second type logical volumes, and wherein said local copy means, by writing said write target data in a second type logical volume of said plurality of second type logical volumes that has a free space, writes said write target data in said virtual logical volume.

* * * * *